| United States Patent [19] | [11] Patent Number: 4,727,135 |
| Chiang et al. | [45] Date of Patent: Feb. 23, 1988 |

[54] SYNTHESIS OF POLYQUINOLINE BY THE CATALYTICAL DEHYDROGENATIVE POLYMERIZATION OF TETRAHYDROQUINOLINE

[75] Inventors: Long Y. Chiang, Somerset; Russell R. Chianelli, Somerville, both of N.J.

[73] Assignee: Exxon Research and Engineering Company, Florham Park, N.J.

[21] Appl. No.: 887,364

[22] Filed: Jul. 17, 1986

Related U.S. Application Data

[63] Continuation-in-part of Ser. No. 798,474.

[51] Int. Cl.$^4$ .............................................. C08G 73/06
[52] U.S. Cl. ................................................... 528/423
[58] Field of Search ........................................ 528/423

[56] References Cited

U.S. PATENT DOCUMENTS 3,178,376  4/1965  Cook ................................... 528/423

FOREIGN PATENT DOCUMENTS 1010247  11/1965  United Kingdom .

Primary Examiner—Harold D. Anderson
Attorney, Agent, or Firm—Joseph J. Dvorak

[57] ABSTRACT

A new method for the preparation of polyquinoline is discovered. Upon the treatment of tetrahydroquinoline (THQ) with $ReS_{2+x}$ at the refluxing temperature of THQ, a nearly quantitative yield of polyquinoline is obtained and characterized.

9 Claims, No Drawings

SYNTHESIS OF POLYQUINOLINE BY THE CATALYTICAL DEHYDROGENATIVE POLYMERIZATION OF TETRAHYDROQUINOLINE

CROSS-REFERENCE TO RELATED APPLICATIONS

This application is a continuation-in-part of U.S. Ser. No. 798,474, filed Nov. 15, 1985, now abandoned.

BACKGROUND OF THE INVENTION

Organic polymers with a conjugated backbone form an important class of electronically conducting materials. Conduction mechanism in these types of polymers involve $\pi$-electrons which overlap along the conjugated chain to form a $\pi$-conduction band. These materials are intrinsically semiconductors, and can be made highly conducting only after chemical doping. To date semiconducting polyacetylene remains the most extensively studied of the conjugated polymers due to the availability of its flexible films, the high conductivity upon doping, and the reversibility in the electrochemical oxidation (p-type doping)—reduction (n-type doping) process. The chemical doping of polyacetylene film with electron acceptors such as $AsF_5$ and iodine, or electron donors such as sodium, gives values of conductivity up to $10^3 \Omega^{-1} cm^{-1}$ at room temperature. Unfortunately, there are some practically inconvenient features associated with polyacetylene. Probably the most disadvantageous feature of all is its inherent inconvenient instability towards atmospheric oxidation. This instability hindered the scientific study and its possible technological exploitation. Therefore, a great interest has been generated in the exploration of related polymers with a great oxidative stability as well as thermal stability and processability while retaining the interesting electrical properties.

Based on these considerations, the most pronounced polymers belong to the category of aromatic polyarene polymers. Some examples are: poly(paraphenylene), Shacklette, L. W., Chance, R. R., Ivory, D. M.; Miller, G. G.; Baughman, R. H., *Synth. Met.*, 1980, 1, 307; polypyrrole, Diaz, A, Kanazawa, K. K.; Gardini, G. P., *J. Chem. Soc., Chem. Commun.*, 1979, 635; poly(2,5-thienylene), Yamamoto, T., Sanechika, K., Yamamoto, A., *J. Polym. Sci., Polym. Lett. Ed.*, 1980, 18, 9; Lin, J., Dudek, L., *J. Polym. Sci., Polym. Chem. Ed.*, 1980, 18, 2689; poly(phenylquinoline), Wrasidlo, W., Norris, S. O., Wolfe, J. F., Katto, T., Stille, J. K., *Macromolecules,* 1976, 9, 512, polyselenophene, Yoshino, K., Kaneto, K., Inoue, S., Tsukagoshi, K., *Jap. J. Appl. Phys.*, 1983, 22, L701, and polynaphthalene, Aldissi, M., Liepins, R., *J. Chem. Soc., Chem. Commun.*, 1984, 255. Among these polyaromatics, poly(phenylquinoline), and its derivatives are generally the most thermal oxidative stable polymers. Films based on these poly(phenylquinoline) derivatives have been reported to exhibit conductivities of up to the order of $50\Omega^{-1} cm^{-1}$ upon doping with sodium, Tunney, S. E.; Suenaga, J.; Stille, J. K., *Macromolecules,* 1983, 16, 1398, Denisevich, P.; Papir, Y. S.; Kurkov, V. P.; Current, S. P.; Schroeder, A. H.; Suzuki, S., *Polym. Prepr., Am. Chem. Soc., Div. Polym. Chem.*, 1983, 24, 330-1, a seventeen orders of magnitude increase in conductivity compared to the undoped material. Surprisingly, to date the nonsubstituted polyquinoline of the present invention has not yet been made in spite of many substituted polyquinoline derivatives having been successfully synthesized, Stille, J. K., *Macromolecules,* 1981, 14, 870–80.

It is known that polyquinoline derivatives can be prepared by a Friedlander synthesis, Friedlander, P. *Chem. Ber.* 1882, 15, 2572, which is a base catalyzed reaction between 2-aminobenzaldehyde and acetaladehyde. This type of reaction was found to undergo a far better satisfactory result with an acid catalyst of poly(-phosphoric acid) than base catalysis in the polymer synthesis with a higher molecular weight product and a higher yield. Thus, homopolymer or copolymer of quinoline derivatives can be readily prepared by a condensative cyclization reaction between aromatic o-amino ketone and ketomethylene compounds to construct quinoline moieties. However, this method is most suitable for the synthesis of substituted polyquinolines but not for the nonsubstituted polyquinoline due to the side reaction of the aldehyde functionality if an o-amino aldehyde is used instead of o-amino ketone.

SUMMARY OF THE INVENTION

The present invention is a process for polymerizing certain aromatic nitrogen heterocyclic compounds under catalytic conditions with a metal sulfide catalyst wherein the metal is selected from the group consisting of transition metals of Group VI, VII and VIII of the periodic table or mixtures thereof. A preferred catalyst is rhenium sulfide. These compounds include tetrahydroquinoline, 3-monosubstituted trihydroquinoline, 4-monosubstituted trihydroquinoline, and 3,4-disubstituted dihydroquinoline, where the substitution includes any organic alkyl or aryl group.

In a preferred embodiment, the aromatic nitrogen heterocyclic compound is tetrahydroquinoline

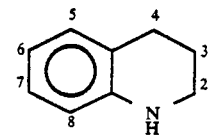

and the reaction product is polyquinoline

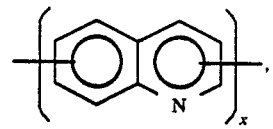

where the valence bond may be attached at any ring position and x may be any integer $\geq 2$. Doped polyquinoline can be used as an electrical conductor or as a photoconductor in various applications, such as plastic battery, photoconductive cells, light weight conductor, and magnetic shielding material.

DESCRIPTION OF THE PREFERRED EMBODIMENT

In the preferred embodiment, a nonsubstituted polyquinoline is prepared by a dehydrogenative polymerization of tetrahydroquinoline (THQ) in the presence of rhenium sulfide catalyst at the refluxing temperature of THQ in a high yield (>90%). The new method provides a facile one-step synthesis from a commercially available starting material, THQ. It certainly offers an advantage over the Friedlander synthesis since no more complicated monomer synthesis is necessary.

Commercial grade tetrahydroquinoline was used directly without further purification. In general, an amorphous powder of rhenium sulfide with a surface area of 20–30 m$^2$/g is used. Crystalline rhenium sulfides are prepared by a thermal treatment of amorphous rhenium sulfides at an elevated temperature between 400° C. and 800° C. Suitable rhenium sulfide catalysts may be prepared as described in U.S. Pat. No. 4,308,171.

EXAMPLE

General Procedure for Dehydrogenative Polymerization Reaction

A single-neck round bottle flask equipped with a condensor and an inert gas bubbler was charged with a solution of tetrahydroquinoline (25 ml, 98%, 0.19 mol) and a proper amount of rhenium sulfide catalyst (500 mg to 1 g). The suspension mixture was maintained under an argon atmospheric pressure and heated in the heating mantle at 150° C. initially and then at 200° to 300° C. for two days to one week. A preferred temperature is about 270° C.

At this temperature, a gentle reflux of tetrahydroquinoline was obtained. At the end of the reaction, the resulting product was cooled to the room temperature to give a dark solid. It was transferred into a solution mixture of diethylether-hexane/1:3 (300 ml). The resulting suspension solution was stirred overnight at the room temperature. The insoluble solid was then filtered and washed with another portion of diethylether-hexane/1:3 (50 ml). A repeated methylene chloride extraction of the solid separated the product into a methylene chloride soluble fraction and a methylene chloride insoluble fraction. The methylene chloride soluble fraction was dried on a rotary evaporator to give an orange-brown thick paste which solidified on standing. It was then chromatographed on a silica gel column using a solvent mixture of ethyl-acetate-hexane/1:3 as eluent initially. The solvent composition was changed slowly to ethylacetate-methylene chloride-hexane/1:1:2. The elution of column chromatography was continued until no more product in the eluent can be detected. Combined solvents were evaporated to afford a yellow solid of the soluble polyquinoline in a 54% yield (13.5 g).

The methylene chloride insoluble fraction was treated with a highly concentrated aqueous hydrochloric acid solution of a ratio of conc. HCl-H$_2$O/1:1 (500 ml) overnight with a vigorous stirring. The resulting thick solution was diluted with water (500 ml) and then filtered through a sintered glass frit under vacuum. The insoluble black solid was washed with more portions of dilute hydrochloric acid and water to give a black recovered catalyst (580 mg to 1.2 g).

The remaining hydrochloric acid solution was neutralized by an addition of sodium hydroxide pellets to afford a precipitation. The filtration of precipitates gave a gray solid of the methylene chloride insoluble polyquinoline in a 36% yield (9 g). Therefore, the combined fractions of polyquinoline gave a total yield of higher than 90%.

Identification of Polymer Structure

The structure of the polymer obtained from the catalytic tetrahydroquinoline polymerization is elucidated mainly based on the soluble oligmer isolated from the bulk polymer product. Elemental analysis formulates the polymer as $C_9H_{5+x}N$ of the polyquinoline composition. The value of x varies as a function of the degree of polymerization with a hydrogen atom as an end group. Mass spectrum (EI) of the methylene chloride soluble oligmer shows a clear consecutive weight loss of 127 which matches with the unit weight of quinoline in the polymer. It also shows ion fragmentations of 128, 255, 382, 509, and so forth corresponding to the monomeric, dimeric, trimeric, and tetrameric polyquinoline fragment.

Infrared spectrum of both oligmer and bulk polymer shows a new band at 821 cm$^{-1}$ corresponding to the C—H out-of-plane deformation of heterocyclic ring moiety of quinoline in addition to a band at 746 cm$^{-1}$ of the C—H out-of-plane deformation of benzene ring moiety of quinoline when it is compared with the IR spectrum of tetrahydroquinoline. It indicates that the heterocyclic ring moiety of polymer has been fully dehydrogenated. This observation is consistent with the disappearance of a band at 2800-2930 cm$^{-1}$ in the IR spectrum of polymer corresponding to the aliphatic C—H stretch in THQ molecule.

The high aromaticity nature of the polymer is further confirmed by the NMR study. Both $^1$H-NMR and $^{13}$C-NMR of the polymer isolated as a methylene chloride insoluble acetic acid (CD$_3$CO$_2$D) soluble fraction contains either none or only a trace of aliphatic hydrogens and aliphatic carbons. The most characteristic peak in the proton NMR is the doublet peak at 9.74 ppm (H=2 Hz) which is corresponding to the α (position 2) proton adjacent to the nitrogen atom in the quinoline unit. Due to the much lower intensity of this peak relative to the intensity of the rest of the aromatic protons combined, it indicates that one of the ring conjunctions has occurred at the α carbon next to the nitrogen atom in the polymer. Meanwhile, based on the calculation of the intensity ratio between that of the peak at 9.74 ppm and peaks at 7.46 ppm to 8.95 ppm, we obtain an average repeating quinoline unit of seven in the methylene chloride insoluble acetic acid soluble fraction of the polymer. It was found that the methylene chloride soluble fraction of polymer still contains a small percentage of incompletely dehydrogenated hydrocarbons. The amount of the aliphatic moiety (carbon) is estimated to be less than 3% from the calculation of the integration of aliphatic hydrogens in the $^1$H-NMR (dissolved in CDCl$_3$). However, the $^{13}$C-NMR of this fraction provides less clear evidence of the existence of aliphatic carbons in the spectrum. In general, partially saturated heterocyclics has a higher polarity than the fully aromatized one. Thus, an aliphatic hydrocarbon free polyquinoline can be isolated from this fraction by the collection of early eluents of chromatography as identified by $^1$H-NMR (dissolved in CDCl$_3$). With the same technique of molecular weight estimation from $^1$H-NMR as described previously, the methylene chloride soluble fraction of polymer consists of an average repeating quinoline unit 5.6. Finally, the acetic acid insoluble fraction of polymer is believed to have a higher molecular weight than the soluble one.

The origin of the dehydrogenative polymerization of tetrahydroquinoline is studied by the reaction of various compounds of THQ analog with rhenium sulfide. As a result, no polymer was obtained in the reaction with pyrrolidine, piperidine, tetrahydrothiophene, tetrahydronaphthalene, and quinoline. It implied that a combination of aromatic hydrocarbons with an active hydrogen atom on the adjacent heteroatom is an ideal system for the polymerization to occur. Interestingly, quinoline itself did not polymerize in the presence of rhenium sulfide at 260° C. It clearly indicates that a stable aromatic quinoline ring gives no contribution to the polymerization mechanism.

The chemical reaction of tetrahydroquinoline occurs apparently on the surface of rhenium sulfide since a high crystalline, low surface area rhenium sulfide gave a much less satisfied result with a low yield of polymer. We found that 2 to 4 weight percent is the ultimate amount of amorphous catalyst required for a complete reaction. Upon the decrease of catalyst concentration, both the yield and the aromaticity decline. For example, at a catalyst concentration of 0.4% wt. level, we observe only a methylene chloride insoluble polyquinoline in 10% yield and a soluble polymer containing a high intensity of aliphatic hydrocarbon in 27% yield. Furthermore, no polymer is obtained with a 0.04% wt. of catalyst concentration.

What is claimed is:

1. A process for polymerizing at least one aromatic nitrogen heterocyclic compound selected from the group consisting of tetrahydroquinoline, 3-mono-organo-substituted trihydroquinoline, 4-mono-organo-substituted trihydroquinoline and 3,4-di-organo-substituted dihydroquinoline wherein said organo-substituent is selected from alkyl or aryl groups, which process comprises heating at least one said compound in the presence of a metal sulfide catalyst wherein the metal is selected from the group consisting of transition metals of Groups VI, VII and VIII of the periodic table or mixtures thereof.

2. The process of claim 1 wherein said catalyst is rhenium sulfide.

3. The process of claim 2 wherein said aromatic nitrogen heterocyclic compound polymerized is tetrahydroquinoline.

4. The process of claim 2 wherein said aromatic nitrogen heterocyclic compound polymerized is 3-substituted trihydroquinoline.

5. The process of claim 2 wherein said aromatic nitrogen heterocyclic compound polymerized is 4-substituted trihydroquinoline.

6. The process of claim 2 wherein said aromatic nitrogen heterocyclic compound polymerized is 3,4-substituted dihydroquinoline.

7. The polymeric reaction product produced by the process of claim 3.

8. A polymer consisting essentially of recurring non-substituted polyquinoline moieties represented by the formula:

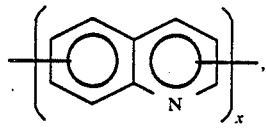

wherein x is an integer $\geq 2$.

9. A polymer consisting essentially of recurring non-substituted polyquinoline moieties represented by the formula:

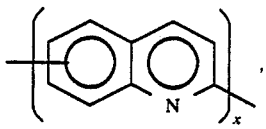

wherein x is an integer $\geq 2$.

* * * * *